UNITED STATES PATENT OFFICE.

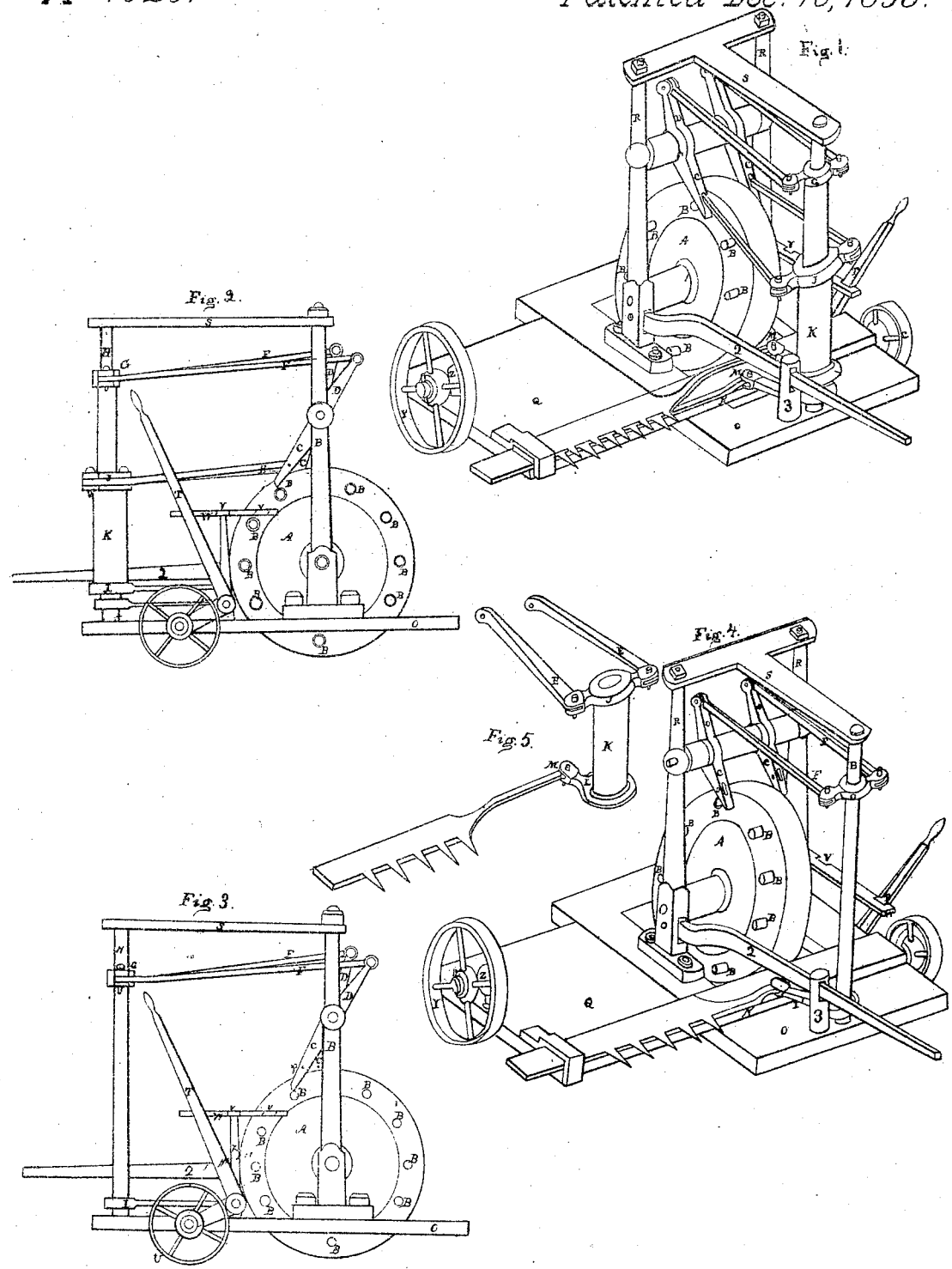

DANIEL C. SMITH, OF TECUMSEH, MICHIGAN.

IMPROVEMENT IN REAPING AND MOWING MACHINES.

Specification forming part of Letters Patent No. 16,251, dated December 16, 1856.

*To all whom it may concern:*

Be it known that I, DANIEL C. SMITH, of Tecumseh, county of Lenawee, and State of Michigan, have invented a new and useful Improvement in Reaping and Mowing Machines; and I do declare that the following is a full and exact description thereof, reference being had to the accompanying drawings, and to the letters marked thereon.

The nature of my invention relates to a peculiar mode of operating two sickles at the same time, as will be fully shown hereinafter.

Figure 1 of the accompanying drawings represents an oblique view of the reaping and mowing machine, showing the application of power to produce motion to two sickles at the same time. Fig. 2 represents an end view of the same machine. Fig. 4 represents an oblique view of the same machine represented in Fig. 1, after removing therefrom its rock-shaft K, with its arms, sickle, and connections, and represented by itself in Fig. 5, leaving Fig. 4 to exhibit the application of power to produce motion to one sickle. Fig. 3 represents an end view of Fig. 4.

To describe the operations of my said machine, I will commence a description of some of the parts and their office, as seen in Fig. 1.

A represents the driving-wheel; B B, teeth at alternate positions on the opposite sides of the driving-wheel, striking the pallets C C, connected by the arms E E with the arm I on hollow rock-shaft K, giving motion to the arm L, and connecting at M with the upper sickle, and the arms D D, connected by the arms F F with the arm G on rock-shaft H, giving motion to the arm I, connecting at M with the lower sickle. The like description, to the extent of showing the motion of the lower sickle in Fig. 1, equally applies to the operation of the corresponding parts of Fig. 4, where the single sickle is used.

What I claim as my invention, and desire to secure by Letters Patent, is—

The combination of rock-shaft H with hollow rock-shaft K, when the same are connected for joint operation in moving two sickles at once by means of mechanism above described, and arranged and operated in relation to each other from main wheel A, as above set forth and described.

DANIEL C. SMITH.

Witnesses:
EDWIN B. WOOD,
C. A. STACY.